US012532263B2

United States Patent
Tramoni

(10) Patent No.: US 12,532,263 B2
(45) Date of Patent: Jan. 20, 2026

(54) WIRELESS COMMUNICATION DEVICE CONFIGURED FOR ULTRA-WIDEBAND COMMUNICATION

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 273 days.

(21) Appl. No.: 18/243,175

(22) Filed: Sep. 7, 2023

(65) Prior Publication Data
US 2024/0089860 A1 Mar. 14, 2024

(30) Foreign Application Priority Data
Sep. 8, 2022 (FR) ....................................... 2208995

(51) Int. Cl.
| | |
|---|---|
| H04W 52/02 | (2009.01) |
| H04B 1/69 | (2011.01) |
| H04B 5/00 | (2024.01) |
| H04B 5/70 | (2024.01) |
| H04W 4/80 | (2018.01) |
| H04W 12/02 | (2009.01) |

(52) U.S. Cl.
CPC .......... H04W 52/0274 (2013.01); H04B 1/69 (2013.01); H04B 5/70 (2024.01)

(58) Field of Classification Search
None
See application file for complete search history.

(56) References Cited

U.S. PATENT DOCUMENTS

| | | | |
|---|---|---|---|
| 8,275,068 B2* | 9/2012 | Rofougaran | H03F 1/0266 455/114.3 |
| 8,582,497 B2* | 11/2013 | Rofougaran | H03F 1/0222 375/216 |
| 10,708,920 B2* | 7/2020 | Kitazoe | H04W 76/27 |
| 11,079,784 B2* | 8/2021 | Yun | G11C 29/021 |
| 11,635,779 B2* | 4/2023 | Yun | G11C 5/04 365/226 |

(Continued)

FOREIGN PATENT DOCUMENTS

CN 114430543 A 5/2022

OTHER PUBLICATIONS

CN 114430543, Chen etal., Communication Control Method of Mobile Terminal, Device Storage Medium and Electronic Device, May 3, 2022, English translation, whole document.*

(Continued)

*Primary Examiner* — Tuan A Tran
(74) *Attorney, Agent, or Firm* — Crowe & Dunlevy LLC

(57) ABSTRACT

A wireless communication device includes a battery, and a platform powered by the battery, with the platform including a processor. The device also includes a voltage regulator powered by the battery, an ultra-wideband communication unit powered by the voltage regulator via the platform when the platform is powered up, and a near-field communication unit powered directly by the battery, and being configured to order the voltage regulator to power the ultra-wideband communication unit when the platform is powered down.

22 Claims, 2 Drawing Sheets

(56) References Cited

U.S. PATENT DOCUMENTS

| | | | |
|---|---|---|---|
| 11,713,022 B1* | 8/2023 | Pearson | H02J 50/001 |
| | | | 340/5.61 |
| 11,900,750 B2* | 2/2024 | Pirch | G07C 9/29 |
| 11,928,906 B2* | 3/2024 | Pirch | G01S 13/765 |
| 12,074,446 B2* | 8/2024 | Harish Gopala Pillai | ............ |
| | | | H05B 47/19 |
| 12,113,571 B2* | 10/2024 | Dutz | H04B 1/7163 |
| 12,142,102 B2* | 11/2024 | Pirch | H01Q 5/25 |
| 2017/0179717 A1* | 6/2017 | Livne | G01L 5/12 |

OTHER PUBLICATIONS

INPI Search Report and Written Opinion for priority application, FR 2208995, report dated Mar. 16, 2023, 9 pgs.

\* cited by examiner

WIRELESS COMMUNICATION DEVICE CONFIGURED FOR ULTRA-WIDEBAND COMMUNICATION

PRIORITY CLAIM

This application claims the priority benefit of French Application for Patent No. 2208995, filed on Sep. 8, 2022, the content of which is hereby incorporated by reference in its entirety to the maximum extent allowable by law.

TECHNICAL FIELD

Embodiments and implementations disclosed herein relate to contactless communication, and more specifically to ultra-wideband technology.

BACKGROUND

Ultra-wideband communication is a radio modulation method based on the transmission of pulses of very short duration, often less than a nanosecond, and over a broad frequency range. Thus, the bandwidth can attain very high values.

In particular, ultra-wideband can use various pulse methods. For example, ultra-wideband can use pulse position modulation (PPM), on-off keying (OOK) modulation, or biphase modulation. Ultra-wideband can be used over a frequency band between 6 GHz and 10 GHz, for example of the order of 8 GHz.

A device serving as an "anchor" used for ultra-wideband communication is configured to detect ultra-wideband pulses emitted by a device serving as a "tag" located nearby. In particular, a device serving as an "anchor" can be used to locate targeted devices situated nearby. Ultra-wideband communication can for example be used to remotely open a car securely. Ultra-wideband communication can also be used for indoor geolocation.

Ultra-wideband communication consumes a large amount of energy. Indeed, pulses are emitted regularly with a high power. Thus, it is common to power down the ultra-wideband communication unit of a device in order to reduce the energy consumption thereof, when ultra-wideband communication is not wanted.

To start up communication between a device serving as an "anchor" and a targeted device serving as a tag, the transmission phase of the device serving as an "anchor" must match the reception phase of the targeted device. To ensure this synchronization, it is common to use a wake-up radio unit to wake up, and therefore power up, the ultra-wideband communication unit. It is particularly known to use a Bluetooth® communication unit as the wake-up radio unit to wake up the ultra-wideband communication unit.

In some devices, particularly in mobile phones, Bluetooth® is only available when the device is switched on. Thus, it is then impossible to activate ultra-wideband communication when the device is switched off.

Moreover, in some other devices, such as Airtag® devices from Apple Inc., the Bluetooth® communication unit is only used as a wake-up radio unit for ultra-wideband communication. In this case, the Bluetooth® communication unit proves to be cumbersome in the device.

Therefore, there is a need for a solution with a low energy consumption enabling a device to start up ultra-wideband communication, even when this device is switched off.

SUMMARY

According to an aspect, a wireless communication device is proposed including: a battery; a platform powered by the battery; the platform comprising a processor; a voltage regulator powered by the battery; an ultra-wideband communication unit powered by the voltage regulator via the platform when the platform is powered up; and a near-field communication unit powered directly by the battery and configured to order the voltage regulator to power the ultra-wideband communication unit when the platform is powered down.

Thus, the device is configured to start up ultra-wideband communication via the near-field communication unit when the platform is powered down. The near-field communication unit can thus be used as a wake-up radio unit when the platform is powered down and switched off. In particular, the power supply of the near-field communication unit is maintained even when the platform is powered down, as this unit is powered directly by the battery. Thus, the ultra-wideband communication unit can be woken up by the near-field communication unit when the platform is powered down. Once the ultra-wideband communication unit is powered, it can perform probing to detect the presence of an ultra-wideband field.

In an advantageous embodiment, the near-field communication unit has inputs/outputs connected to inputs/outputs of the ultra-wideband communication unit. The near-field communication unit may include a voltage regulator powered directly by the battery and configured to power the inputs/outputs of the near-field communication unit and the inputs/outputs of the ultra-wideband communication unit when the platform is powered down.

The inputs/outputs of the near-field communication unit are configured to send a probing request to the inputs/outputs of the ultra-wideband communication unit, the ultra-wideband communication unit being configured to perform probing of an ultra-wideband field when it receives a probing request from the near-field communication unit.

In an embodiment, the near-field communication unit includes a counter configured to count down a maximum probing period during which the ultra-wideband communication unit can perform ultra-wideband field probing.

The ultra-wideband communication unit may be configured to be placed on standby if the ultra-wideband communication unit does not detect an ultra-wideband field during its probing. The ultra-wideband communication unit may include a counter configured to count down a maximum standby period during which the near-field communication unit is placed on standby, the near-field communication unit being configured to exit from standby at the end of the maximum standby period.

The platform includes a power management unit with at least one voltage regulator.

In an embodiment, the ultra-wideband communication unit includes an input/output power supply unit configured to power the inputs/outputs thereof. The near-field communication unit may include a secondary power supply input and a secondary power supply output, and an input/output power supply input configured to power the inputs/outputs thereof, the secondary power supply input being connected to a regulator of the power management unit, the secondary power supply output being connected to the input/output power supply input of the near-field communication unit and to the input/output power supply input of the ultra-wideband communication unit.

The near-field communication unit may further include a switch between the secondary power supply input and the second power supply output, the switch being configured to be closed when the platform is powered down and to be open when the platform is powered up. Thus, when the platform is powered up, the voltage generated by the voltage regulator of the power management unit is applied to the input/output power supply input of the ultra-wideband communication unit and to the input/output power supply input of the near-field communication unit via the secondary power supply input, the closed switch and the secondary power supply output. When the platform is powered down, the voltage generated by the voltage regulator of the near-field communication unit is applied to the input/output power supply input of the ultra-wideband communication unit and to the input/output power supply input of the near-field communication unit via the secondary power supply output.

The device may further include an 'OR' type logic gate having: a first input connected to an output of the power management unit, a second input connected to an output of the near-field communication unit, and an output configured to control the voltage regulator such that the voltage regulator is configured to be controlled by the power management unit when the platform is powered up and by the near-field communication unit when the platform is powered down.

Also disclosed herein is a method for initiating ultra-wideband (UWB) communication in a device having a platform, a near-field communication (NFC) unit, and an ultra-wideband (UWB) communication unit. The method includes powering down the platform while maintaining power supply to the NFC unit through direct connection to a battery, and asserting a control signal, via the NFC unit, to cause a first voltage regulator external to the NFC unit to power the UWB communication unit to thereby wake-up the UWB communication unit. The method further includes powering inputs/outputs of the NFC unit and inputs/outputs of the UWB communication unit using a voltage regulator internal to the NFC unit, thereby permitting communication between the NFC unit and the UWB communication unit, and sending a probing request from the NFC unit to the UWB communication unit to cause the UWB communication unit to probe for an ultra-wideband field during a probing period.

If an ultra wide-band field is not detected during the probing period, the method may include causing the NFC unit to deassert the control signal to thereby cease wake-up of the UWB communication unit.

The probing period may be set by causing countdown of a first timer in the NFC unit.

The method may further include placing the NFC unit into a standby state for a standby period, if the ultra wide-band field is not detected during the probing period.

The standby period may be set by causing countdown of a second timer in the NFC unit.

The method may further include starting an ultra-wideband communication with a device emitting the ultra-wideband field, if the ultra-wideband field is detected during a probing period.

The probing period may be set by counting down of a second counter within the NFC unit.

Also disclosed herein is a wireless communication device, including: a battery; a platform including a processor and a power management unit (PMU); a near-field communication (NFC) unit; a ultra-wideband (UWB) communications unit; and a regulator external to the NFC unit and the UWB communication unit.

The NFC unit may include: first inputs/outputs powered by a first regulator of the PMU and coupled for data communication with the processor; an internal regulator powered directly by the battery; second inputs/outputs powered by the internal regulator when the platform is powered down but powered by a second regulator of the PMU when the platform is powered up; and control signal output circuitry configured to assert a first control signal to cause turn-on of the regulator external to the NFC unit when the platform is powered down.

The PMU may be configured to assert a second control signal to cause turn-on of the regulator external to the NFC unit when the platform is powered up, the UWB communication unit may be powered by the regulator external to the NFC unit in response to assertion of the first control signal, but is powered by the regulator external to the NFC unit in response to assertion of the second control signal. The UWB communication unit may include: first inputs/outputs powered by a third regulator of the PMU and coupled for data communication with the processor; and second inputs/outputs connected to the second inputs/outputs of the NFC unit and powered thereby so that the second inputs/outputs of the UWB communication unit are powered by the internal regulator of the NFC unit when the platform is powered down but powered by the second regulator of the PMU when the platform is powered up.

The UWB communication unit may be configured to be woken-up when powered by the regulator external to the NFC unit in response to assertion of the first control signal to thereby receive a probe request from the NFC unit sent via the connection between the second inputs/outputs of the NFC unit and the second inputs/outputs of the UWB communication unit.

The UWB communication unit may be configured to probe for an ultra-wideband field during a probing period.

The UWB communication circuit may be configured to start an ultra-wideband communication with a device emitting the ultra-wideband field during the probing period, if the ultra-wideband field is detected during the probing period.

The NFC unit may also include a first counter configured to set the probing period.

The UWB communication unit may be configured to cause the control signal output circuitry to deassert the first control signal if the ultra-wideband field is not detected during the probing period to thereby place the NFC unit into a standby state for a standby period.

The NFC unit may also include a second counter configured to set the standby period.

BRIEF DESCRIPTION OF THE DRAWINGS

Further advantages and features will emerge on studying the detailed description of embodiments, which are in no way restrictive, and of the appended drawings wherein.

DETAILED DESCRIPTION

Figure 1:
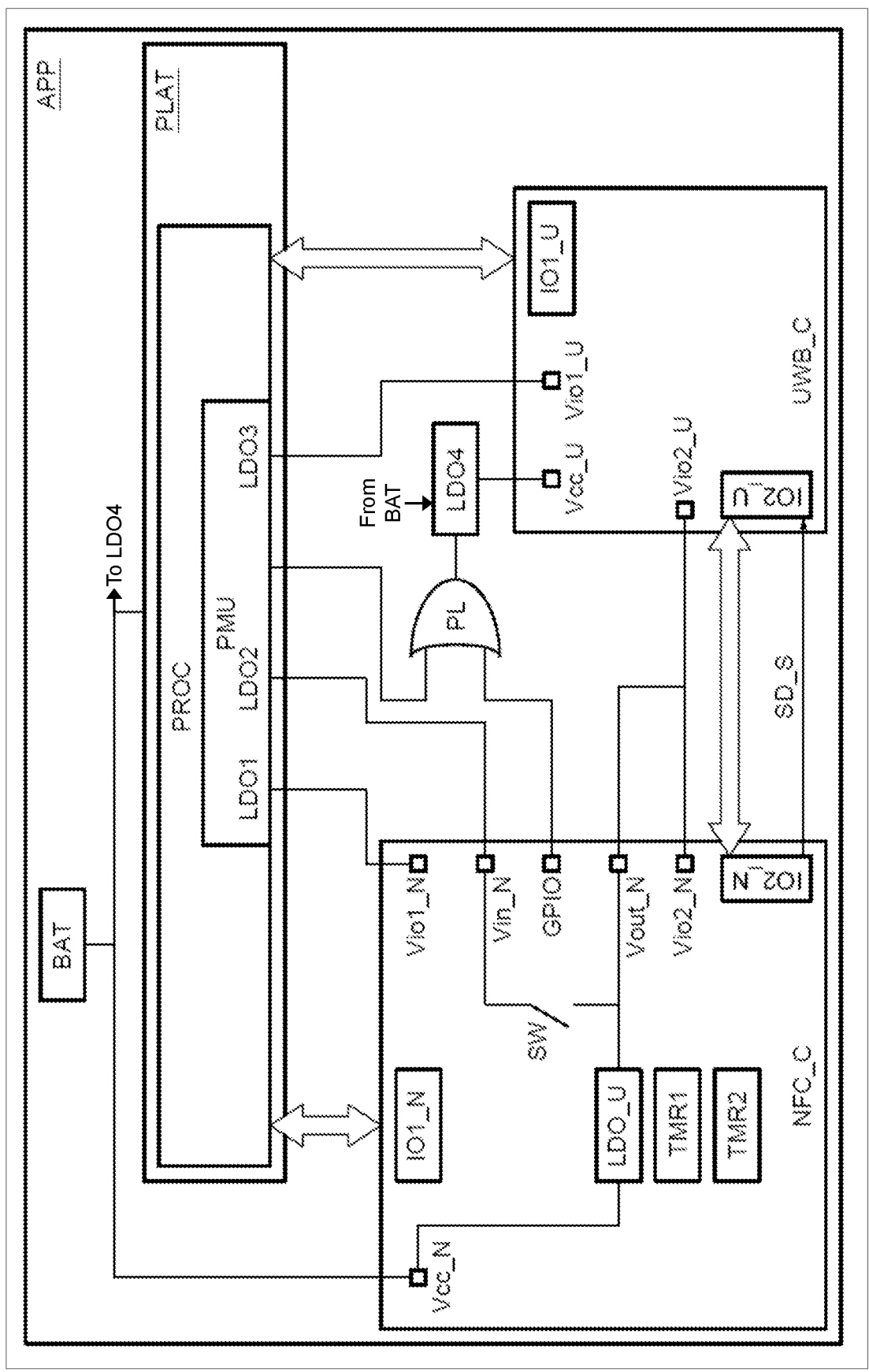
FIG. 1 is a block diagram of an embodiment of this disclosure.

FIG. 1 illustrates a device APP according to an embodiment. The device APP includes a platform PLAT and a battery BAT. The device APP also includes an ultra-wideband communication unit UWB_C and a near-field communication unit NFC_C.

The platform PLAT comprises a processor PROC and a power management unit PMU. The power management unit PMU comprises various voltage regulators LDO1, LDO2 and LDO3. The voltage regulators LDO1, LDO2 and LDO3 are particularly low-dropout regulators.

The near-field communication unit NFC_C is configured to communicate according to the Near-Field Communication (NFC) protocol. In particular, near-field communication is a short-distance high-frequency wireless communication technology, which enables data exchanges between two contactless devices over a short distance for example of the order of 10 cm.

NFC technology is an open technology platform standardized in the ISO/IEC 18092 and ISO/IEC 21481 standard, but incorporates many already existing standards such as for example the type A and type B protocols defined in the ISO-14443 standard, which can be communication protocols that can be used in NFC technology.

The near-field communication unit NFC_C includes a general power supply input Vcc_N connected directly to the battery BAT. The near-field communication unit NFC_C is therefore powered directly by the battery BAT.

The near-field communication unit NFC_C also includes first inputs/outputs IO1_N connected to the processor PROC. The near-field communication unit NFC_C further includes a first input/output power supply input Vio1_N. This first input/output power supply input Vio1_N is connected to a first regulator LDO1 of the power management unit PMU of the processor PROC. This first input/output power supply input Vio1_N is configured to power the first inputs/outputs IO1_N from the voltage generated by the first regulator LDO1. Once the first inputs/outputs IO1_N are powered, the near-field communication unit NFC_C can then communicate with the processor PROC.

The near-field communication unit NFC_C also includes second inputs/outputs IO2_N. The near-field communication unit NFC_C further includes a second input/output power supply input Vio2_N. This second input/output power supply input Vio2_N is configured to power the second inputs/outputs IO2_N.

The near-field communication unit NFC_C further includes a voltage regulator LDO_U. The voltage regulator LDO_U is particularly a low-dropout regulator. The near-field communication unit NFC_C also includes a secondary power supply output Vout_N. The output Vout_N is connected to the output of the voltage regulator LDO_U. The output Vout_N is also connected to the second input/output power supply input Vio2_N.

The near-field communication unit NFC_C further includes a secondary power supply input Vin_N, an output GPIO and an output Vio2_N. The input Vin_N is connected to a second voltage regulator LDO2 of the power management unit PMU.

The near-field communication unit NFC_C further includes a switch SW between the input Vin_N and the output Vout_N. The switch SW is configured to be closed when the platform PLAT is powered up and to be open when the platform PLAT is powered down.

The ultra-wideband communication unit is configured to be able to communicate in ultra-wideband. Ultra-wideband communication is a radio modulation method based on the transmission of pulses of very short duration, often less than a nanosecond, and over a broad frequency range. Thus, the bandwidth can attain very high values. In particular, ultra-wideband can use various pulse methods. For example, ultra-wideband can use pulse position modulation (PPM), on-off keying (OOK) modulation, or biphase modulation. Ultra-wideband can be used over a frequency band between 6 GHz and 10 GHz, for example of the order of 8 GHz.

The ultra-wideband communication unit UWB_C includes a general power supply input Vcc_U, a first input/output power supply input Vio1_U and a second input/output power supply input Vio2_U.

The ultra-wideband communication unit UWBC further includes first inputs/outputs IO1_U and second inputs/outputs IO2_U.

The first inputs/outputs IO1_U of the ultra-wideband communication unit UWB_C are connected to the processor PROC. The first inputs/outputs IO1_U of the ultra-wideband communication unit UWB_C are powered via the first input/output power supply input Vio1_U thereof. The first power supply input Vio1_U is connected to a third voltage regulator LDO3 of the power management unit PMU. Once the first inputs/outputs IO1_U are powered, the ultra-wideband communication unit UWB_C can then communicate with the processor PROC.

The second inputs/outputs IO2_U of the ultra-wideband communication unit UWB_C are connected to the second inputs/outputs IO2_N of the near-field communication unit NFC_C, particularly via a Serial Peripheral Interface (SPI) bus. The second inputs/outputs IO2_U of the ultra-wideband communication unit UWB_C are powered via the second input/output power supply input Vio2_U thereof.

The near-field communication unit NFC_C is configured to send a probing request SD_S to the ultra-wideband communication unit UWB_C via the connection between the second inputs/outputs IO2_N of the near-field communication unit NFC_C and the second inputs/outputs IO2_U of the ultra-wideband communication unit UWB_C. The probing request SD_S enables the ultra-wideband communication unit UWB_C to ascertain whether it is to perform probing of an ultra-wideband field after being woken up by the near-field communication unit NFC_C.

The second input/output power supply input Vio2_U of the ultra-wideband communication unit UWB_C is connected to the second input/output power supply input Vio2_N and to the output Vout_N of the near-field communication unit NFC_C.

The device further includes a voltage regulator LDO4 powered by the battery BAT. This voltage regulator LDO4 is particularly a low-dropout regulator. The general power supply input Vcc_U of the ultra-wideband communication unit UWB_C is connected to the output of this voltage regulator LDO4. The voltage regulator LDO4 is external to the power management unit PMU.

The device also has an 'OR' type logic gate PL. The 'OR' gate has a first input connected to the power management unit PMU and a second input connected to the output GPIO of the near-field communication unit NFC_C. The 'OR' gate furthermore has an output connected to the regulator LDO4. The voltage regulator LDO4 can therefore be controlled either by the power management unit PMU or by the output GPIO of the near-field communication unit NFC_C.

The near-field communication unit NFC_C can be placed on standby. It further includes a first counter TMR1 configured to count down a maximum standby period.

The near-field communication unit NFC_C also includes a second counter TMR2 configured to count down a maximum ultra-wideband probing period.

When the platform PLAT is powered up, the power management unit PMU is powered up. The voltage regulators LDO1, LDO2 and LDO3 then generate voltages. The power management unit also generates a signal delivered at the input of the 'OR' logic gate, then to the voltage regulator LDO4. Thus, the voltage regulator LDO4 generates a voltage which is applied to the general power supply input Vcc_U of the ultra-wideband communication unit UWB_C. The ultra-wideband communication unit UWB_C is then powered. Similarly, the voltage generator LDO3 generates a voltage which is applied to the first input/output power supply input Vio1_U. In this way, the first inputs/outputs IO1_U are powered and can communicate with the processor PROC.

When the platform PLAT is powered up, the voltage generator LDO1 generates a voltage applied to the first input/output power supply input Vio1_N of the near-field communication unit NFC_C. In this way, the first inputs/outputs IO1_N of the near-field communication unit NFC_C are powered. The near-field communication unit NFC_C can therefore communicate with the processor PROC. The voltage generator LDO2 generates a voltage applied to the input Vin_N. The switch SW being closed when the platform PLAT is powered up, this voltage is also applied to the output Vout_N, and therefore to the second input/output power supply input Vio2_N of the near-field communication unit NFC_N and to the second input/output power supply input Vio2_U of the ultra-wideband communication unit UWB_C. In this way, the second inputs/outputs IO2_N of the near-field communication unit NFC_N and the second inputs/outputs IO2_U of the ultra-wideband communication unit UWB_C are powered with the same voltage. Thus, the near-field communication unit NFC_C can communicate with the ultra-wideband communication unit UWB_C.

When the platform PLAT is powered down, the voltage regulators LDO1, LDO2 and LDO3 of the power management unit PMU can no longer be used to power the ultra-wideband communication unit UWB_C. When the platform PLAT is powered down, the power supply of the near-field communication unit NFC_C is maintained, as the general power supply input thereof is directly connected to the battery.

When the platform PLAT is powered down, the near-field communication unit is configured to generate a signal delivered by the output GPIO to the 'OR' logic gate then to the voltage regulator LDO4. The voltage regulator LDO4 can then generate a voltage which it applies to the general power supply input Vcc_N of the ultra-wideband communication unit UWB_C. Thus, the ultra-wideband communication unit UWB_C is powered, and is therefore woken up.

The switch SW is open when the platform PLAT is powered down. Furthermore, the voltage regulator LDO_U is capable of generating a voltage when the platform PLAT is powered down. This voltage can then be applied to the output Vout_N, so as to apply this same voltage to the power supply input Vio2_N of the near-field communication unit NFC_C and to the power supply input Vio2_U of the ultra-wideband communication unit UWB_C. This thus makes it possible to power the second inputs/outputs IO2_N of the near-field communication unit NFC_C and the second inputs/outputs IO2_U of the ultra-wideband communication unit UWB_C.

The near-field communication unit NFC_C can then send the probing request SD_S to the ultra-wideband communication unit UWB_C. Once the probing request has been received, the ultra-wideband communication unit UWB_C is configured to perform probing of an ultra-wideband field.

If the ultra-wideband communication unit UWB_C detects an ultra-wideband field during the probing period counted down by the counter TMR2, then the ultra-wideband communication unit UWB_C is configured to start up ultra-wideband communication with the device having emitted the ultra-wideband field.

If the ultra-wideband communication unit UWB_C does not detect an ultra-wideband field during the probing period counted down by the counter TMR2, then the near-field communication unit NFC_C is configured to stop the wake-up of the ultra-wideband communication unit UWB_C. The near-field communication unit NFC_C can then be placed on standby during the standby period counted down by the counter TMR1.

Such a device APP is therefore configured to start up ultra-wideband communication via the near-field communication unit NFC_C when the platform PLAT is powered down. In particular, the power supply of the near-field communication unit NFC_C is maintained even when the platform PLAT is powered down, as this unit is powered directly by the battery BAT. Thus, the ultra-wideband communication unit UWB_C can be woken up by the near-field communication unit NFC_C when the platform PLAT is powered down. Once the ultra-wideband communication unit UWB_C is powered, it can perform probing to detect the presence of an ultra-wideband field.

Figure 2:
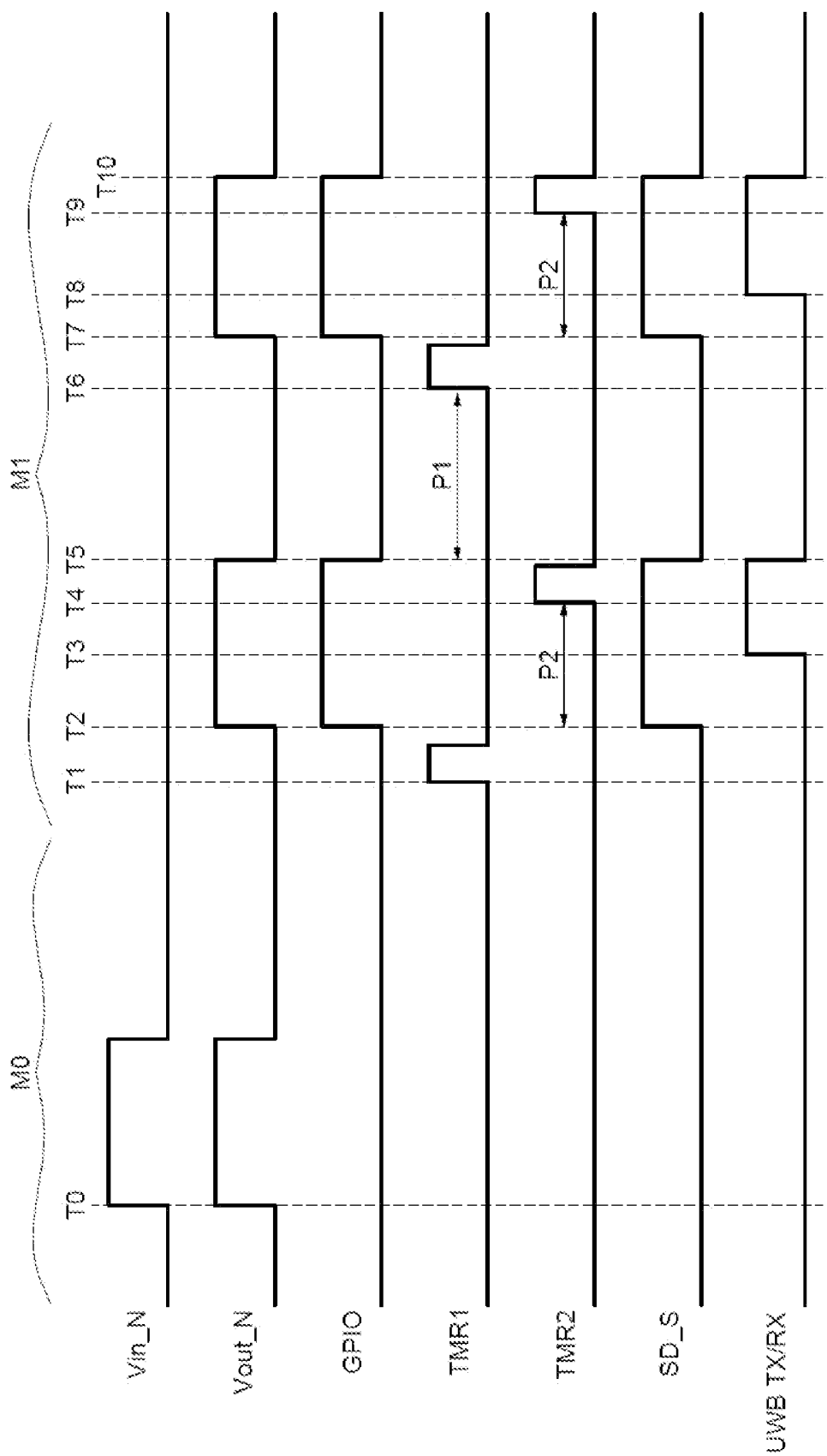
FIG. 2 is a timing diagram showing an embodiment of this disclosure in operation.

FIG. 2 illustrates a timing diagram of an implementation of a device as described above.

Firstly, the platform PLAT is powered up. The switch SW of the near-field communication unit NFC_C is then closed. Thus, at the time T0, the input Vin_N of the near-field communication unit NFC_C receives a voltage generated by the second voltage regulator LDO2. This voltage received by the input Vin_N is applied to the output Vout_N via the switch SW.

Then, secondly, the platform PLAT is powered down. The switch SW of the near-field communication unit NFC_C is then open. The voltage regulator LDO2 no longer generates voltage. At the time T1, the voltage on the input Vin_N of the near-field communication unit NFC_C is therefore zero. At the end of a standby period counted down by the counter TMR1, the voltage regulator LDO_U generates, at the time T2, a voltage which is applied to the output Vout_N of the near-field communication unit NFC_C. Furthermore, the near-field communication unit emits the signal GPIO to wake up the ultra-wideband communication unit UWB_C, and emits the probing request SD_S.

The ultra-wideband communication unit UWB_C then performs, at the time T3, probing of an ultra-wideband field (UWB TX/RX). In parallel, the second counter TMR2 counts down the probing period to the time T4. The probing of the ultra-wideband field is performed until the end of the probing period, at the time T5. Here, the ultra-wideband field unit UWB_C does not detect any ultra-wideband field at the end of the probing period P2. Thus, the signal GPIO and the signal Vout_N stop at the end of the probing period, such that the ultra-wideband communication unit UWB_C is no longer powered.

The near-field communication unit NFC_C can then be placed on standby during said standby period P1 counted down by the counter TMR1 until the time T6. Once the standby period has ended, the near-field communication unit NFC_C exits from its standby. Then, at the time T7, the near-field communication unit NFC_C once again emits the signals GPIO and Vout_N so as to wake up the ultra-wideband communication unit UWB_C, and emits the probing request SD_S. Once the probing request is received, the ultra-wideband communication unit UWB_C once again performs probing at the time T8 during the probing period P2 counted down by the second counter TMR2 to the time T9. The probing ends at the time T10.

The invention claimed is:
1. A wireless communication device, including:
a battery;
a platform powered by the battery, wherein the platform comprises a processor;

a voltage regulator powered by the battery;
an ultra-wideband communication unit powered by the voltage regulator via the platform when the platform is powered up; and
a near-field communication unit powered directly by the battery and configured to order the voltage regulator to power the ultra-wideband communication unit when the platform is powered down.

2. The wireless communication device according to claim 1, wherein the near-field communication unit has inputs/outputs connected to inputs/outputs of the ultra-wideband communication unit, and wherein the near-field communication unit includes a voltage regulator powered directly by the battery and configured to power the inputs/outputs of the near-field communication unit and the inputs/outputs of the ultra-wideband communication unit when the platform is powered down.

3. The wireless communication device according to claim 2, wherein the inputs/outputs of the near-field communication unit are configured to send a probing request to the inputs/outputs of the ultra-wideband communication unit, the ultra-wideband communication unit being configured to perform probing of an ultra-wideband field when it receives a probing request from the near-field communication unit.

4. The wireless communication device according to claim 3, wherein the near-field communication unit includes a counter configured to count down a maximum probing period during which the ultra-wideband communication unit can perform ultra-wideband probing.

5. The wireless communication device according to claim 3, wherein the ultra-wideband communication unit is configured to be placed on standby if the ultra-wideband communication unit does not detect an ultra-wideband field during the probing thereof, and wherein the ultra-wideband communication unit includes a counter configured to count down a maximum standby period during which the near-field communication unit is placed on standby, the near-field communication unit being configured to exit from the standby thereof at an end of the maximum standby period.

6. The wireless communication device according to claim 2,
wherein the ultra-wideband communication unit includes an input/output power supply input configured to power the inputs/outputs thereof,
wherein the near-field communication unit includes a secondary power supply input and a secondary power supply output, and an input/output power supply input configured to power the inputs/outputs thereof,
the secondary power supply input being connected to a regulator of a power management unit,
the secondary power supply output being connected to the input/output power supply input of the near-field communication unit and to the input/output power supply input of the ultra-wideband communication unit, and
wherein the near-field communication unit further includes a switch between the secondary power supply input and the secondary power supply output,
the switch being configured to be closed when the platform is powered up and to be open when the platform is powered down.

7. The wireless communication device according to claim 1, wherein the platform includes a power management unit comprising at least one voltage regulator.

8. The wireless communication device according to claim 7, further comprising an 'OR' type logic gate having:
a first input connected to an output of the power management unit;
a second input connected to an output of the near-field communication unit; and
an output configured to control the voltage regulator, such that the voltage regulator is configured to be controlled by the power management unit when the platform is powered up and controlled by the near-field communication unit when the platform is powered down.

9. A method for initiating ultra-wideband (UWB) communication in a device having a platform, a near-field communication (NFC) unit, and an ultra-wideband (UWB) communication unit, the method comprising:
powering down the platform while maintaining power supply to the NFC unit through direct connection to a battery;
asserting a control signal, via the NFC unit, to cause a first voltage regulator external to the NFC unit to power the UWB communication unit to thereby wake-up the UWB communication unit;
powering inputs/outputs of the NFC unit and inputs/outputs of the UWB communication unit using a voltage regulator internal to the NFC unit, thereby permitting communication between the NFC unit and the UWB communication unit; and
sending a probing request from the NFC unit to the UWB communication unit to cause the UWB communication unit to probe for an ultra-wideband field during a probing period.

10. The method of claim 9, further comprising, if an ultra wide-band field is not detected during the probing period, causing the NFC unit to deassert the control signal to thereby cease wake-up of the UWB communication unit.

11. The method of claim 10, wherein the probing period is set by causing countdown of a first timer in the NFC unit.

12. The method of claim 10, further comprising placing the NFC unit into a standby state for a standby period, if the ultra wide-band field is not detected during the probing period.

13. The method of claim 12, wherein the standby period is set by causing countdown of a second timer in the NFC unit.

14. The method of claim 9, further comprising further comprising starting an ultra-wideband communication with a device emitting the ultra-wideband field, if the ultra-wideband field is detected during a probing period.

15. The method of claim 14, wherein the probing period is set by counting down of a second counter within the NFC unit.

16. A wireless communication device, including:
a battery;
a platform including a processor and a power management unit (PMU);
a near-field communication (NFC) unit;
a ultra-wideband (UWB) communication unit;
a regulator external to the NFC unit and the UWB communication unit;
wherein the NFC unit comprises:
first inputs/outputs powered by a first regulator of the PMU and coupled for data communication with the processor;
an internal regulator powered directly by the battery;
second inputs/outputs powered by the internal regulator when the platform is powered down but powered by a second regulator of the PMU when the platform is powered up; and control signal output circuitry configured to assert a first control signal to cause turn-on of the regulator external to the NFC unit when the platform is powered down;

wherein the PMU is configured to assert a second control signal to cause turn-on of the regulator external to the NFC unit when the platform is powered up;

wherein the UWB communication unit is powered by the regulator external to the NFC unit in response to assertion of the first control signal, but is powered by the regulator external to the NFC unit in response to assertion of the second control signal; and wherein the UWB communication unit comprises:
first inputs/outputs powered by a third regulator of the PMU and coupled for data communication with the processor; and
second inputs/outputs connected to the second inputs/outputs of the NFC unit and powered thereby so that the second inputs/outputs of the UWB communication unit are powered by the internal regulator of the NFC unit when the platform is powered down but powered by the second regulator of the PMU when the platform is powered up.

17. The wireless communication device of claim 16, wherein the UWB communication unit is configured to be woken-up when powered by the regulator external to the NFC unit in response to assertion of the first control signal to thereby receive a probe request from the NFC unit sent via the connection between the second inputs/outputs of the NFC unit and the second inputs/outputs of the UWB communication unit.

18. The wireless communication device of claim 17, wherein the UWB communication unit is configured to probe for an ultra-wideband field during a probing period.

19. The wireless communication device of claim 18, wherein the UWB communication unit is configured to start an ultra-wideband communication with a device emitting the ultra-wideband field during the probing period, if the ultra-wideband field is detected during the probing period.

20. The wireless communication device of claim 19, wherein the NFC unit further comprises a first counter configured to set the probing period.

21. The wireless communication device of claim 18, wherein the UWB communication unit is configured to cause the control signal output circuitry to deassert the first control signal if the ultra-wideband field is not detected during the probing period to thereby place the NFC unit into a standby state for a standby period.

22. The wireless communication device of claim 21, wherein the NFC unit further comprises a second counter configured to set the standby period.

* * * * *